United States Patent
Asterjadhi et al.

(10) Patent No.: US 9,179,449 B2
(45) Date of Patent: *Nov. 3, 2015

(54) APPARATUS AND METHODS FOR CONTROL FRAME AND MANAGEMENT FRAME COMPRESSION

(71) Applicant: Qualcomm Incorporated, San Diego, CA (US)

(72) Inventors: Alfred Asterjadhi, San Diego, CA (US); Simone Merlin, San Diego, CA (US); Maarten Menzo Wentink, San Diego, CA (US); Santosh Paul Abraham, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/719,972

(22) Filed: Dec. 19, 2012

(65) Prior Publication Data

US 2013/0301523 A1 Nov. 14, 2013

Related U.S. Application Data

(60) Provisional application No. 61/646,035, filed on May 11, 2012.

(51) Int. Cl.
*H04W 4/00* (2009.01)
*H04W 72/04* (2009.01)
*H04W 28/06* (2009.01)
*H04L 1/00* (2006.01)

(52) U.S. Cl.
CPC .......... *H04W 72/0406* (2013.01); *H04W 28/06* (2013.01); *H04L 1/00* (2013.01); *H04L 1/0061* (2013.01)

(58) Field of Classification Search
CPC ...................................... H04W 72/12
USPC .................. 370/312, 328–339; 455/452
See application file for complete search history.

(56) References Cited

U.S. PATENT DOCUMENTS

2004/0179521 A1 * 9/2004 Kim et al. ............... 370/384
2004/0213274 A1 10/2004 Fan et al.
(Continued)

FOREIGN PATENT DOCUMENTS

EP 1195955 A2 4/2002
WO 2009034553 A2 3/2009

OTHER PUBLICATIONS

International Search Report and Written Opinion—PCT/US2013/039932—ISA/EPO—Aug. 19, 2013.

*Primary Examiner* — Iqbal Zaidi
(74) *Attorney, Agent, or Firm* — S. Hossain Beladi

(57) ABSTRACT

Systems, methods, and devices for communicating frames having a plurality of types are described herein. In some aspects, the frames include a compressed frame, such as a compressed management frame or a compressed control frame. In some aspects, a method of communicating in a wireless network includes generating a management frame including a local identifier or a global identifier for a transmitter of the management frame based on a link type over which the management frame is transmitted, a local identifier or a global identifier for a recipient of the management frame based on the link type, a frame check sequence, and information indicating the link type. The method further includes transmitting the management frame.

24 Claims, 17 Drawing Sheets

(56) References Cited

U.S. PATENT DOCUMENTS

| | | |
|---|---|---|
| 2005/0210324 A1 | 9/2005 | Abe et al. |
| 2006/0268715 A1 | 11/2006 | Zuniga et al. |
| 2007/0047583 A1 | 3/2007 | Assa et al. |
| 2007/0201468 A1* | 8/2007 | Jokela .......................... 370/390 |
| 2009/0089577 A1 | 4/2009 | Shon et al. |
| 2009/0146833 A1 | 6/2009 | Lee et al. |
| 2013/0128808 A1 | 5/2013 | Wentink et al. |
| 2013/0128809 A1* | 5/2013 | Wentink et al. ............... 370/328 |

* cited by examiner

| Frame Control | bits | |
|---|---|---|
| 502 — pv | 2 | Protocol Value (1) |
| 504 — type | 4 | Frame Type (16 total) |
| 506 — from-ap | 1 | From-AP |
| 508 — ac | 2 | Access Category |
| 510 — retry | 1 | Retry |
| 512 — pm | 1 | Power Management |
| 514 — md | 1 | Mode Data |
| 516 — pf | 1 | Protected Frame (0) |
| 518 — a-msdu | 1 | A-MSDU |
| 520 — eosp | 1 | End of Service Period |
| 522 — a3 present | 1 | A3 present |
| total | 16 | |

| | bits | Description |
|---|---|---|
| 602 — | 2 | Protocol Value (0) |
| 604 — | 2 | Frame Type |
| 605 — | 4 | Frame subtype |
| 606 — | 1 | From-AP |
| 612 — | 1 | Power Management |
| 614 — | 1 | Mode Data |
| 616 — | 1 | Protected Frame (0) |
| 618 — | 1 | A-MSDU |
| 620 — | 1 | End of Service Period |
| 622 — | 1 | A3 present |
| 624 — | 1 | More PPDU/RDG |
| | 16 | |

FIG. 6

| bits | Description |
|---|---|
| 702 — 2 | Protocol Value (1) |
| 704 — 4 | Frame Type (16 total) |
| 706 — 1 | From-AP |
| 712 — 1 | Power Management |
| 8 | |

FIG. 7

| Data ||||| 
|---|---|---|---|---|
| Direction | Address Interpretation (From-AP) | A1 | A2 | A3 (SA/DA) |
| DL | 1 | Rx-AID | BSSID | (SA) |
| UL | 0 | BSSID | Tx-AID | (DA) |
| Direct | 0 | RA | Tx-AID | |

FIG. 8

APPARATUS AND METHODS FOR CONTROL FRAME AND MANAGEMENT FRAME COMPRESSION

The present application claims priority to provisional U.S. Application Ser. No. 61/646,035, entitled "APPARATUS AND METHODS FOR CONTROL FRAME AND MANAGEMENT FRAME COMPRESSION," filed May 11, 2012, assigned to the assignee hereof and incorporated herein by reference in its entirety.

BACKGROUND

1. Field

The present application relates generally to wireless communications, and more specifically to systems, methods, and devices for compressing frames including control frames and management frames.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise management frames and/or control frames.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size of management frames and/or control frames.

One aspect of the disclosure provides a method of communicating in a wireless network. The method comprises generating a management frame including a local identifier or a global identifier for a transmitter of the management frame based on a link type over which the management frame is transmitted, a local identifier or a global identifier for a recipient of the management frame based on the link type, a frame check sequence, and information indicating the link type. The method further comprises transmitting the management frame.

Another aspect of the disclosure provides a method of communicating in a wireless network. The method comprises generating a control frame selectively including a local identifier or a global identifier based on a link type over which the control frame is transmitted, a frame check sequence, and information indicating the link type. The method further comprises transmitting the control frame.

Another aspect of the disclosure provides an apparatus for communicating in a wireless network. The apparatus comprises a processor configured to generate a management frame including a local identifier or a global identifier for a transmitter of the management frame based on a link type over which the management frame is transmitted, a local identifier or a global identifier for a recipient of the management frame based on the link type, a frame check sequence, and information indicating the link type. The apparatus further comprises a transmitter configured to transmit the management frame.

Another aspect of the disclosure provides an apparatus for communicating in a wireless network. The apparatus comprises a processor configured to generate a control frame selectively including a local identifier or a global identifier based on a link type over which the control frame is transmitted, a frame check sequence, and information indicating the link type. The apparatus further comprises a transmitter configured to transmit the control frame.

Another aspect of the disclosure provides an apparatus for communicating in a wireless network. The apparatus comprises means for generating a management frame including a local identifier or a global identifier for a transmitter of the management frame based on a link type over which the management frame is transmitted, a local identifier or a global identifier for a recipient of the management frame based on the link type, a frame check sequence, and information indicating the link type. The apparatus further comprises means for transmitting the management frame.

Another aspect of the disclosure provides an apparatus for communicating in a wireless network. The apparatus comprises means for generating a control frame selectively including a local identifier or a global identifier based on a link type over which the control frame is transmitted, a frame check sequence, and information indicating the link type. The apparatus further comprises means for transmitting the control frame.

Another aspect of the disclosure provides a computer-readable medium comprising instructions that when executed by a computer cause the computer to perform a method of communicating in a wireless network. The method comprises generating a management frame including a local identifier or a global identifier for a transmitter of the management frame based on a link type over which the management frame is transmitted, a local identifier or a global identifier for a recipient of the management frame based on the link type, a frame check sequence, and information indicating the link type. The method further comprises transmitting the management frame.

Another aspect of the disclosure provides a computer-readable medium comprising instructions that when executed by a computer cause the computer to perform a method of communicating in a wireless network. The method comprises generating a control frame selectively including a local identifier or a global identifier based on a link type over which the control frame is transmitted, a frame check sequence, and information indicating the link type. The method further comprises transmitting the control frame.

BRIEF DESCRIPTION OF THE DRAWINGS

FIG. 5 illustrates an example of a frame control field format.

FIG. 6 illustrates another example of a frame control field format.

FIG. 7 illustrates another example of a frame control field format.

FIG. 8 illustrates an example of a type of identifier (global or local) that may be used for different address fields in a frame, such as the management frame.

DETAILED DESCRIPTION

Figure 1:
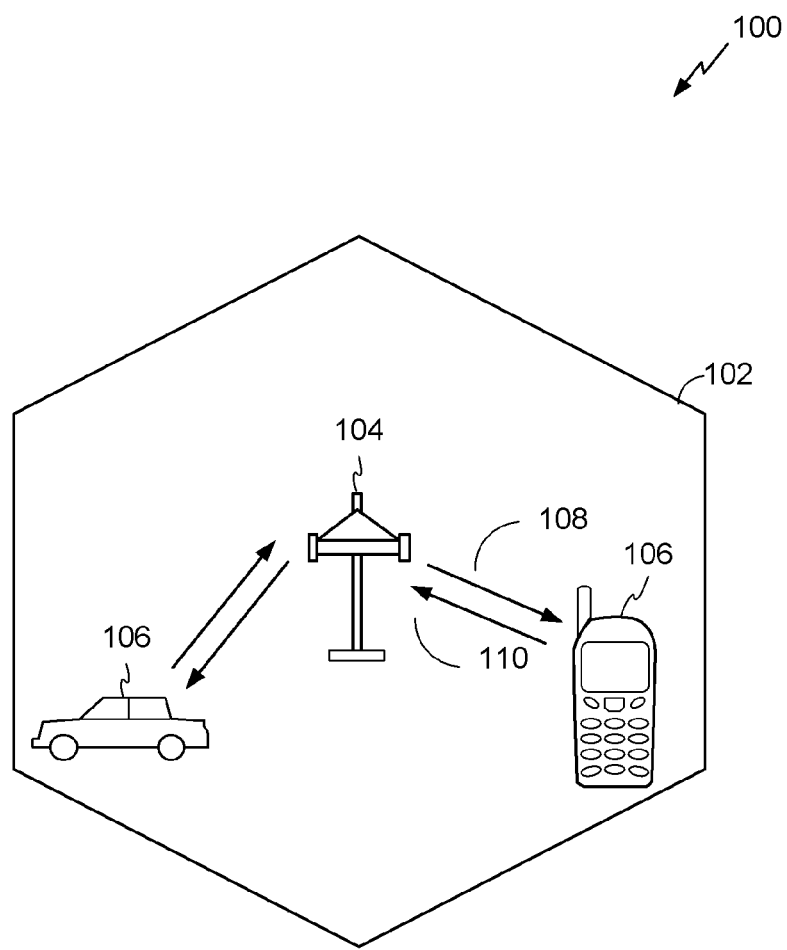
FIG. 1 illustrates an example of a wireless communication system in which aspects of the present disclosure may be employed.

Various aspects of the novel systems, apparatuses, and methods are described more fully hereinafter with reference to the accompanying drawings. The teachings may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. Further, in some aspects, STAs 106 may communicate directly with each other and form a direct link (direct) between each other.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. In another example, the functions of the AP 104 described herein may alternatively be performed by one or more of the STAs 106.

Figure 2:
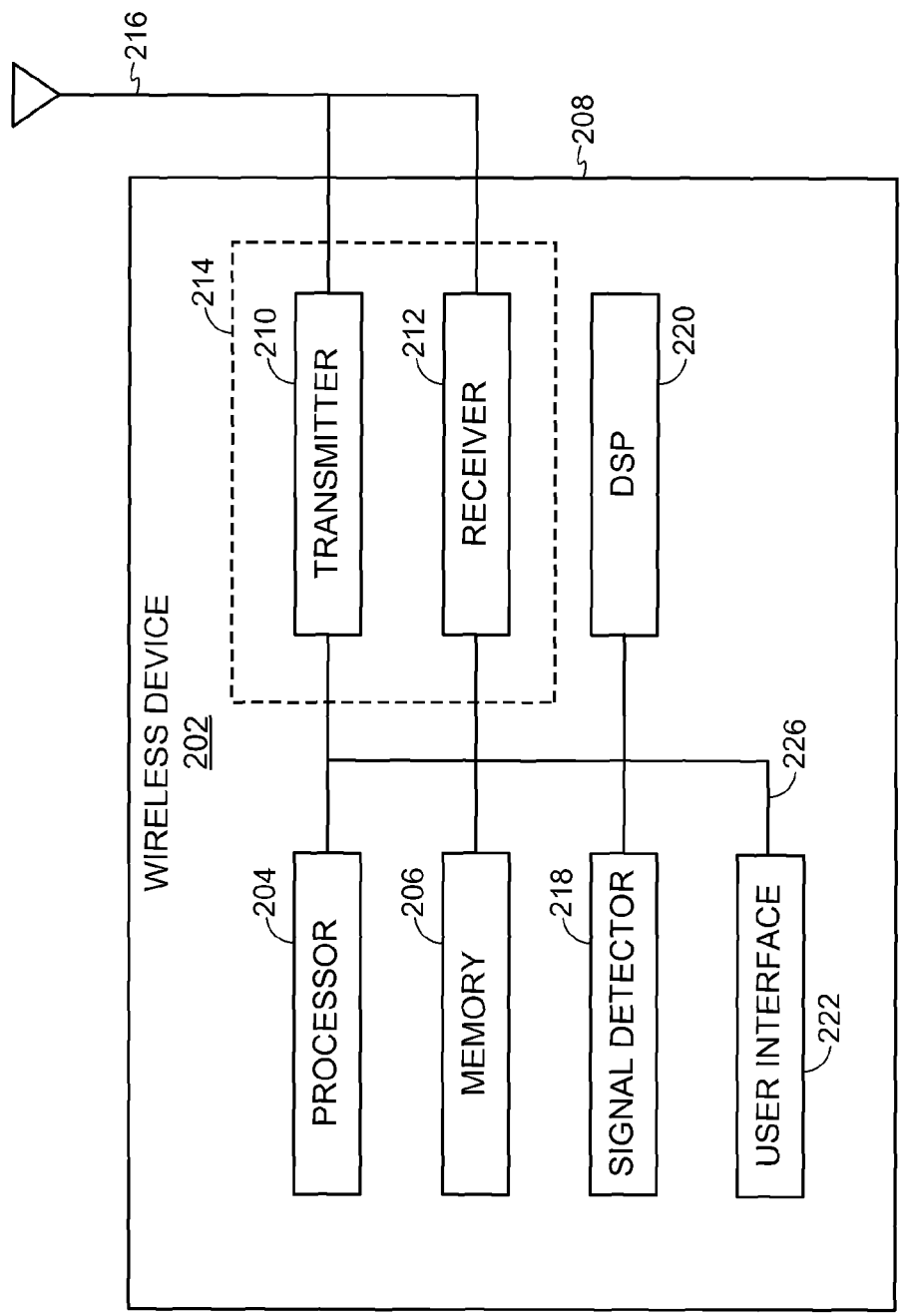
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to generate compressed control frames and/or compressed management frames. Further, processor 204 may be configured to select one of a plurality of control frames and/or management frames, and to generate a packet having that control frame type and/or management frame type.

When the wireless device 202 is implemented or used as a receiving node, the processor 204 may be configured to process control frames and/or management frames of different types. For example, the processor 204 may be configured to determine the type of control frame and/or management frame received and process the control frame and/or management frame accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit one or more types of control frames and/or management frames. For example, the transmitter 210 may be configured to transmit compressed control frames and/or compressed management frames generated by the processor 204, discussed above.

The receiver 212 may be configured to wirelessly receive one or more types of control frames and/or management frames. In some aspects, the receiver 212 is configured to detect a type of control frame and/or management frame and process the frame accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive control frames and/or management frames of different types including compressed control frames and/or compressed management frames.

Figure 3:
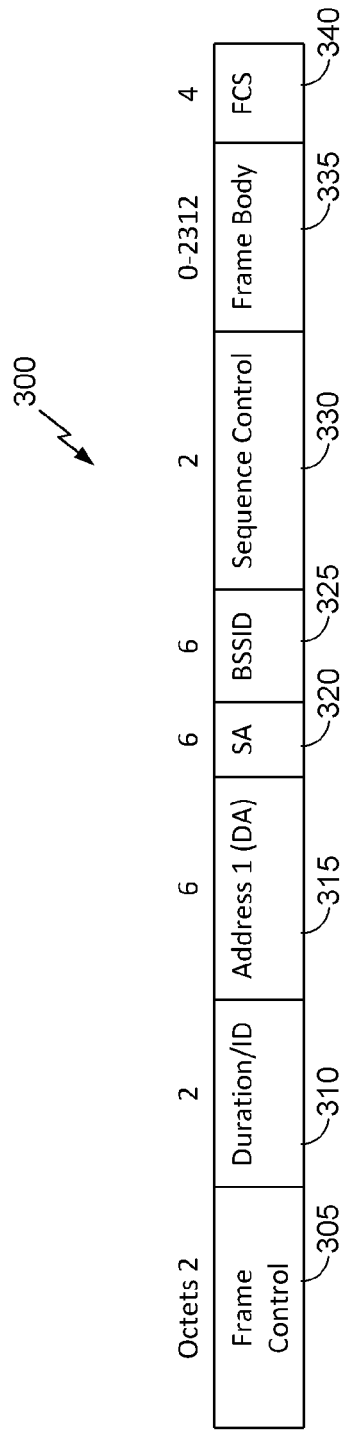
FIG. 3 illustrates an example of a legacy management frame.

FIG. 3 illustrates an example of a legacy management frame 300. The management frame 300 may be a non-compressed management frame. As shown, the management frame 300 includes 8 different fields: a frame control (fc) field 305, a duration/identification (duration) field 310, a destination address (da) field 315 (also referred to as a receiver address (a1)), a sender address (sa) field 320 (also referred to as a transmitter address (a2)), a basic service set identifier (BSSID) field 325 (also referred to as a destination address (a3)), a sequence control (sc) field 330, a frame body 335, and a frame check sequence (FCS) field 340. Each of the da, sa, and BSSID fields 315-325 comprises a full MAC address of a device, which is a 48-bit (6 octet) value. FIG. 3 further indicates the size in octets of each of the fields 305-340. Summing the value of all of the field sizes gives the overall size of the management frame 300. It may be beneficial to reduce the overall size of such a management frame. For example, a reduced size (or "compressed") management frame may utilize less bandwidth for transmission.

Accordingly, systems and methods for using management frames (and similarly control frames) of reduced size (compressed management frames and compressed control frames) are described herein. The use of such compressed management frames and/or compressed control frames reduces the overhead needed to transmit the frame. Thus, less data needs to be transmitted overall. Less transmission of data can increase the speed with which data is transmitted, can reduce the use of bandwidth by a transmitter, and can reduce the power needed for transmission as fewer resources are used to transmit less data.

Compression of management frames and/or control frames may be performed by removing or modifying certain fields of the management frames and/or control frames. The compressed management frames and/or control frames header may then be sent from the wireless device 202t to the wireless device 202r. Removal or modification of the fields may be based on the information that needs to be communicated to the wireless device 202r of the data packet. For example, the wireless device 202r may not need all the information in the management frame 300 to receive and process the data packet. For example, in some cases the receiver may already have some of the information stored in memory that would be transmitted in the management frame 300. In one case, the wireless device 202r may have received that information in a previously received management frame from the wireless device 202t. In another case, the wireless device 202r may have such information pre-programmed such as at the time of manufacture, or through communication with another device.

In yet another embodiment, the wireless device 202r may not perform certain functions that would require the use of fields that have been removed, for example in cases where such functionality is not needed. Below are described some of the fields that may be removed or modified and how the wireless device 202r would function with such a compressed management frame and/or compressed control frame. In some embodiments, the wireless device 202r can determine the format of the management frame and/or control frame used based on an indication in the management frame and/or control frame of the format used as further discussed in detail below. For example, in some embodiments a type field in the fc field of the frame may indicate the format used for the frame (e.g., compressed, type of compression, and/or not compressed). In addition or alternatively, a subtype field in the fc field fo the frame may indicate the format used for the frame In other embodiments, the wireless device 202r and 202t utilize only one type of compressed management frame and/or compressed control frame and accordingly no indication is needed of which type of management frame and/or compressed control frame is used is needed.

In the legacy 802.11 standard (up to and including 802.11ad), a protocol version (pv) subfield of the fc field is always set to 0, since protocol version 0 (PV0) is the only defined protocol version. Accordingly, the use of other values for the protocol version, i.e., 1 (PV1), 2 (PV2), and 3 (PV3), is not defined. Therefore, the systems and methods discussed herein may define compressed management frames and/or compressed control frames as part of protocol version 1 (PV1), PV2, and/or PV3. The protocol versions may be used interchangeably by devices for communication. For instance, PV0 defining use of a legacy management frame may be used for setting up a link, negotiating capabilities, and high speed data transfers. Further, PV1, PV2, and/or PV3 defining use of a compressed management frame and/or compressed control frame may be used for periodic short data transmissions when in power save mode.

In some embodiments, the compressed format management frame and/or control frame may use the existing protocol version 0 (PV0) or the newly defined protocol version 1 (PV1), PV2, and/or PV3. The use of PV1, PV2, and/or PV3 may avoid a situation where legacy devices attempt to parse a received compressed management frame and/or compressed control frame based on the formatting of a legacy PV0 frame.

Figure 4:
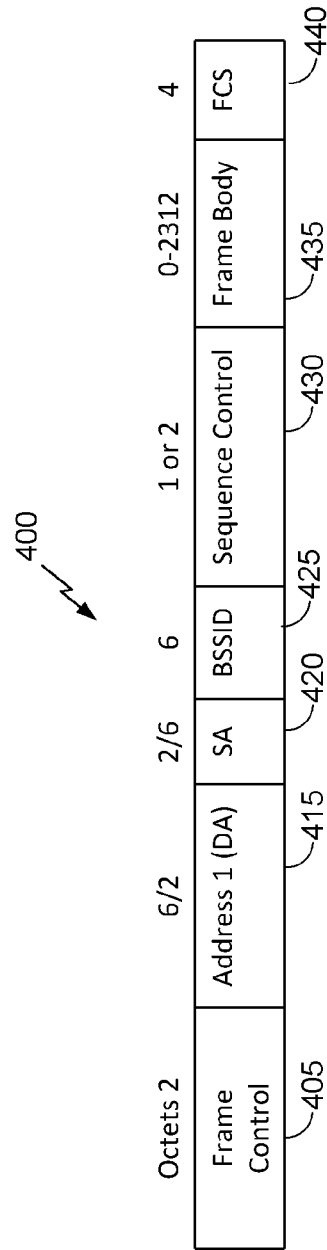
FIG. 4 illustrates an example of a compressed management frame.

FIG. 4 illustrates an example of a compressed management frame 400. As shown, the management frame 400 includes 7 different fields: a frame control (fc) field 405, a destination address (da) field 415 (also referred to as a receiver address (a1)), a sender address (sa) field 420 (also referred to as a transmitter address (a2)), a basic service set identifier (BSSID) field 425 (also referred to as a destination address (a3)), a sequence control (sc) field 430, a frame body 435, and a frame check sequence (FCS) field 440. FIG. 4 further indicates the size in octets of each of the fields 405-440. Summing the value of all of the field sizes gives the overall size of the management frame 400. As shown, one of the da field 415 and the sa field 420 is 6 octets in length, while the other is 2 octets in length as further discussed below. The various fields of the management frame 400 may be utilized according to several different aspects described below.

As shown in the management frame 400, the duration field 310 may be omitted. Normally, a device receiving a frame will decode at least the duration field 310, which indicates a time the device should not transmit so there are no interfering transmissions during the transmit opportunity. Instead of the duration field 310, devices may be configured to not transmit data after receiving management frame until a time for transmitting an acknowledgement by the intended receiver of the management frame has passed. Such acknowledgement may be an ACK or block acknowledgement (BA), indicating the management frame has been received by the intended receiver. The devices may only be configured to defer transmission until an ACK may have been received for the management frame if a field (e.g., an ACK policy field) in the management frame indicates that the device should defer until an ACK is received. Accordingly, the duration field 310 may be omitted from management frames and similarly certain control frames.

In some aspects a duration field may be included in the management frame 400, such as after the fc field 405 and before the da field 415. In some aspects, the duration field may have a reduced length as compared to the duration field 310. For example, the duration field may have a length of 15 bits or less. The value of the duration field may indicate the duration of the data packet in which the management frame 400 is transmitted/received. In some aspects, the value may indicate the duration as multiples of a pre-defined value (e.g., a value expressed in microseconds). In some aspects, the value may be selected to cover one or more transmit opportunity (TX-OP) periods. The length of the duration field may therefore be based on the pre-defined value and the duration of a TX-OP period. For example, if the predefined value is 96 μs and one TX-OP period is 24.576 ms then duration field length may be of 8 bits (e.g., log 2[(TX-OP period)/(pre-define value)]) such that the maximum value of the duration field covers at least on TX-OP period.

In some aspects, the BSSID field 425 is optional, in that it may or may not be included in the management frame 400. A field (e.g., an a3 present field) in the fc field 405 may be used to indicate whether the BSSID field 425 is included in the management frame 400. Accordingly, a receiver of the management frame 400 may check the value of such a field to determine whether or not the BSSID field 425 is present in the management frame 400. It should be noted that the BSSID field 425 may be located after the sequence control field 430 instead of before the sequence control field 430 as indicated in FIG. 4.

In some aspects, the sc field 430 may include a short sequence number (SN) subfield of 8 bits or less that includes the value of a short SN. In some aspects, the short sequence number subfield corresponds to the 8 least significant bits (lsb) of a 12-bit sequence number subfield as defined for an uncompressed management frame such as the management frame 300. In some aspects, if the value of such a short sequence number subfield is 0, the transmitter may send a frame with an uncompressed management frame with the full sequence number instead of a compressed management frame with a short sequence number of value 0. In some aspects, the short sequence number subfield is a different 8-bits of the sc field 430. In some aspects, additionally or alternatively, the sc field 430 may selectively include an extended field. In some aspects, presence or absence of such an extended field in the sc field 430 of the management frame 400 may be indicated by the value of one or more bits in the fc field 405. The extended field may include a fragmentation number subfield (e.g., 4 bits or less), a retry subfield (e.g., 1 bit), a more frag subfield (e.g., 1 bit), and/or a traffic class indication subfield (e.g., 3 bits).

In one aspect, the fc field 405 may have a format such as shown in Table 1:

| Frame Control field for compressed frames | | |
|---|---|---|
| Field Name | Length in bits | Description |
| pv | 2 | protocol version (0 or 1 since there is no duration field) |
| type | 2 | frame type (extension) |
| subtype | 4 | frame subtype (compressed or compressed without a3) |
| to-ds | 1 | to-ds |
| from-ds | 1 | from-ds |
| more frag | 1 | more fragments |
| retry | 1 | retry |
| pm | 1 | power management |

-continued

Frame Control field for compressed frames

| Field Name | Length in bits | Description |
|---|---|---|
| md | 1 | more data |
| pf | 1 | protected frame |
| a-msdu | 1 | indicates presence of a-msdu (short A-MSDU subframe format) |
| total | 16 | |

In other aspects, fc field 405 may have a different format. FIGS. 5-7 illustrate examples of different formats of the fc field 405 that may be included in the management frame 400.

As discussed above, the pv subfield of the fc field may be used to indicate whether a management frame is a legacy management frame or a compressed management frame. For example, a value of 0 for the pv subfield may indicate the management frame is a legacy management frame, and a value of 1 for the pv subfield may indicate the management frame is a compressed management frame. The compressed management frame may have the format of any of the compressed management frames described herein.

For any of the compressed management frames described herein, certain fields may further be added or modified to support certain additional features. In some aspects, an extended frame control (efc) field may be added to any of the compressed management frames described herein. The efc field may comprise 3 bits. The efc field may be the last 3 bits of an aid field of the compressed management frame. The efc may be utilized to add information for new features. For example, in some aspects, an a3 present subfield may be added to the fc field or another field (e.g., efc field) of the management frame to indicate whether an a3 address (3$^{rd}$ address identifying a device) is included in the compressed management frame. Additionally or alternatively, in some aspects, quality of service (QoS) subfields that indicate the value of certain QoS parameters are added to the fc field or another field of the management frame (e.g., efc field), such as an access control (ac) subfield, an end of service period (eosp) subfield, an a-msdu subfield, and/or a queue size subfield. Additionally or alternatively, in some aspects, an ACK policy subfield may be moved to the SIG field of the compressed management frame. Additionally or alternatively, in some aspects, an a4 subfield may be added to the fc field or another field (e.g., efc field) of the management frame to indicate whether the packet is to be relayed. The a4 subfield may be 1 bit. It should be noted that any combination of these fields may used in any of the compressed management frames described herein to support the features of the fields. In some aspects, the compressed management frame indicated by a value of 1 for the pv subfield may support features and have a format as discussed herein.

FIG. 5 illustrates an example of a frame control field format. As shown, the frame control field 500 includes a pv subfield 502 of 2 bits, a type subfield 504 of 4 bits, a from-AP subfield 506 of 1 bit, an access category (ac) subfield 508 of 2 bits, a retry subfield 510 of 1 bit, a power management (pm) subfield 512 of 1 bit, a mode data (md) subfield 514 of 1 bit, a protected frame (pf) subfield 516 of 1 bit, an a-msdu subfield 518 of 1 bit, an end of service period (eosp) subfield 520 of 1 bit, and an a3 present subfield 55 of 1 bit. Of these subfields, as discussed above, the ac subfield 508, the a-msdu subfield 518 the eosp subfield 520, and the a3 present subfield 522 may be included or not included in the fc field 500 in any combination so as to only support the features of the included fields.

FIG. 6 illustrates another example of a frame control field format. As shown, the frame control field 600 includes a pv subfield 602 of 2 bits, a type subfield 604 of 2 bits, a subtype subfield 605 of 4 bit, a from-AP subfield 606 of 1 bit, a power management (pm) subfield 612 of 1 bit, a mode data (md) subfield 614 of 1 bit, a protected frame (pf) subfield 616 of 1 bit, an a-msdu subfield 2218a of 1 bit, an end of service period (eosp) subfield 620 of 1 bit, an a3 present subfield 622 of 1 bit, and a more ppdu/rdg subfield 624 of 1 bit. In some aspects, of these subfields, as discussed above, the a-msdu subfield 618, the eosp subfield 620, the a3 present subfield 622, and the more ppdu/rdg subfield 624 may be included or not included in the fc field 600 in any combination so as to only support the features of the included fields. In some aspects, the more ppdu/rdg subfield may be one of the 3 reserved bits of an efc field. In some aspects, the more ppdu/rdg subfield may be one of the available bits when a compressed management frame does not include a fragment number field.

FIG. 7 illustrates another example of a frame control field format. As shown, the frame control field 700 includes a pv subfield 702 of 2 bits, a type subfield 704 of 2 bits, a from-AP subfield 706 of 1 bit, and a power management (pm) subfield 712 of 1 bit.

Further, as discussed below, all the bits in the 2 octet length sa or da field may not be used, as only 13-bits may be used. The other three bits may be utilized for other purposes. For example, the traffic ID (TID) may be included in the 2 octet length sa or da field instead of in the qc field.

In some aspects, instead of using a globally unique identifier for a device (e.g., MAC address) for both the da field 415 and the sa field 420 as is used in the legacy management frame 300 (or similarly used in certain control frames), one of the da field 415 or the sa field 420 uses a local identifier, such as an access identifier (AID), that uniquely identifies a device in a particular basic service set (BSS), but does not necessarily uniquely identify the device globally. Accordingly, one of the da field 415 or the sa field 420 may be 2 octets in length to accommodate the shorter local identifier, as opposed to 6 octets in length as needed for the global identifier. This helps reduce the size of the management frame 400. In some aspects, the selection of which of the da field 415 and the sa field 420 includes a local identifier or a global identifier is based on the device sending the packet and the device receiving the packet. For example, the selection may be different for packets sent on each of a downlink from an AP to a STA, an uplink from a STA to an AP, and a direct link from one STA to another STA. Indication of the type of link (e.g., downlink, uplink, or direct link) may be made by one or more fields in a management frame or a control frame. For example, a from-AP field may have one value for a management frame sent on a downlink and another value for a management frame sent on an uplink. Additionally or alternatively, a from-ds and/or to-ds field may have different values for different link types. A device receiving the frame may therefore determine the link the frame is received over (for example based on a field value) and then determine the length of the da field and/or sa field in the frame.

FIG. 8 illustrates an example of what type of identifier (global or local) may be used for different address fields in a frame, such as the management frame 400. As shown, the type of identifier used in the address fields is different for different link types (different depending on the direction of the communication). The direction column indicates the direction of the link. The address interpretation column indicates the value of a field (e.g., from-AP) that may be used in interpreting the direction in which the frame is sent. The a1 field may correspond to an a1 field such as the da field 415 of the management frame 400. The a2 field may correspond to an a2 field such as the sa field 420 of the management frame 400. The a3 field may correspond to an a3 field such as the BSSID field 425 of the management frame 400. Rx-AID may refer to a receiver AID or local identifier, which is the AID of the receiver of the frame. Tx-AID may refer to a transmitter AID or local identifier, which is the AID of the transmitter of the frame. RA may refer to a receiver address, which may be a global identifier such as the MAC address of a receiver of the packet. BSSID may refer to a global identifier such as a BSSID of a device. SA and DA may refer to a local identifier, of a source of the management frame and a destination of the management frame, respectively.

It should be noted that FIG. 8 illustrates just one combination of local and global identifiers that may be used for each different link type. However, as one of skill in the art will recognize, any combination of local identifiers and global identifiers for each of the addresses and for each of the link types may be used, so long as each frame includes at least one local identifier and at least one global identifier. Accordingly, if a frame includes only an a1 field and an a2 field, one field should be a local identifier and one field should be a global identifier. It should be noted, that for any combination of address fields in any combination of frames herein, instead of including the actual local identifier (AID) or global identifier (e.g., BSSID, MAC address), a hash of the local identifier and/or global identifier may be included. It should be noted that by using the local identifier of one device and a global identifier of another device, the pair of devices may be uniquely identified. For example, the global identifier uniquely identifies one device. For any given local identifier, that one device may only communicate with one other device having that local identifier. Therefore, the pair is uniquely identifiable.

The above discussion has been made with respect to compression of management frames. However, it should be noted that similar techniques may be used for the compression of control frames. In particular, the aspects of fc fields described above with respect to Table 1 and FIGS. 5-7 may similarly be used as the fc field of a control frame. Further, a type of control frame may be indicated in a similar manner as a type of management frame as discussed above. In addition, whether an a3 address field is present in a control frame may be indicated in a similar manner as described above with respect to management frames. Further, a duration field may be omitted from a control frame in a similar manner as described above or have a similar format as a duration field as described above with respect to management frames. In addition, an sc field of the control frame may be similar to the sc field of the control frame 430 discussed above. Continuing, as discussed with respect to FIG. 8, the address fields may have different identifier types (local or global) for different link types in any combination as discussed above. Examples of control frames are described below with respect to FIGS. 9-25.

Figure 9:
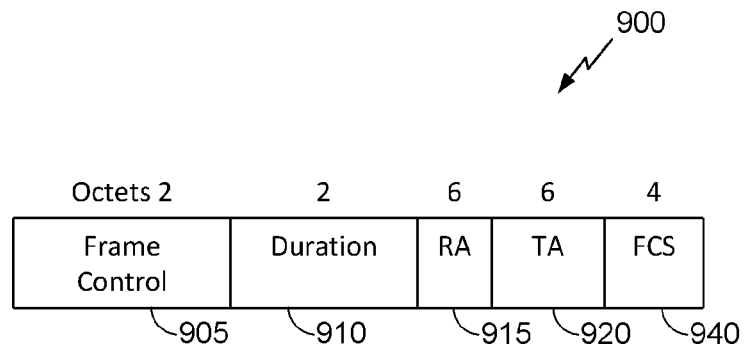
FIG. 9 illustrates an uncompressed request to send (RTS) control frame.

FIG. 9 illustrates an uncompressed request to send (RTS) control frame 900. An RTS may be transmitted by a device requesting a channel for transmission. As shown, the RTS frame 900 includes 5 different fields: a frame control (fc) field 905, a duration field 910, a receiver address (ra) field 915 (also referred to as a receiver address (a1)), a transmitter address (ta) field 920 (also referred to as a transmitter address (a2)), and a frame check sequence (FCS) field 940. FIG. 9 further indicates the size in octets of each of the fields 905-940. Each of the ra and ta fields 915-920 comprises a full MAC address of a device, which is a 48-bit (6 octet) value. Summing the value of all of the field sizes gives the overall size of the uncompressed RTS frame 900, which is 20 octets.

Figure 10:
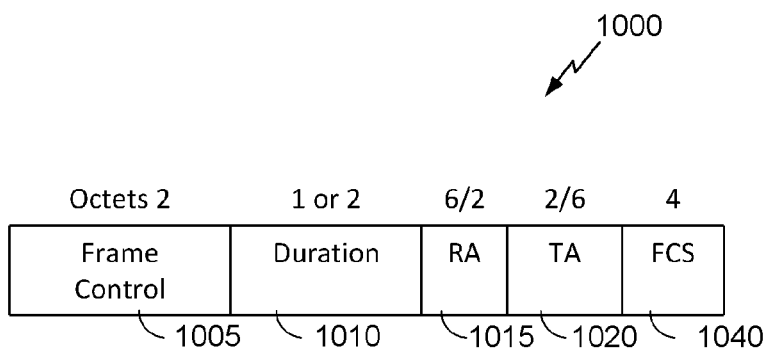
FIG. 10 illustrates a compressed request to send (RTS) control frame.

FIG. 10 illustrates a compressed request to send (RTS) control frame 1000. As shown, the RTS frame 1000 includes 5 different fields: a frame control (fc) field 1005, a duration field 1010, a receiver address (ra) field 1015 (also referred to as a receiver address (a1)), a transmitter address (ta) field 1020 (also referred to as a transmitter address (a2)), and a frame check sequence (FCS) field 1040. FIG. 10 further indicates the size in octets of each of the fields 1005-1040. As shown, one of the ra field 1015 and the ta field 1020 is 6 octets in length for a global identifier, while the other is 2 octets in length for a local identifier as discussed above. For example, for an RTS sent from an AP to a STA, the ra field 1015 may include a 2 byte AID of the AP, the ta field 1020 may include a 6 byte BSSID, and a from-AP field of the fc field 1005 may have a value of 1. In another example, for an RTS sent from a STA to an AP, the ra field 1015 may include a 6 byte BSSID, the ta field 1020 may include a 2 byte AID of the STA, and a from-AP field of the fc field 1005 may have a value of 0. The duration field 1010 may be reduced in size (e.g., to 1 byte) from duration field 910 of the uncompressed RTS control frame 900, for example, by having the value of the duration field 1010 indicate a number of transmit opportunity (TX-OP) periods as discussed above.

Figure 11:
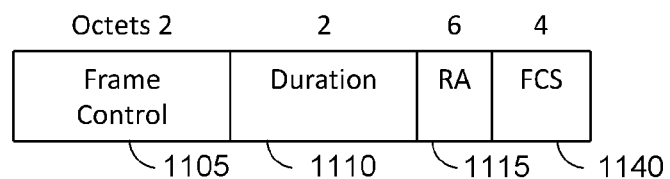
FIG. 11 illustrates an uncompressed clear to send (CTS) control frame.

FIG. 11 illustrates an uncompressed clear to send (CTS) control frame 1100. A CTS may be transmitted by a device to reserve a channel for communication, such as in response to receipt of a RTS. As shown, the CTS frame 1100 includes 4 different fields: a frame control (fc) field 1105, a duration field 1110, a receiver address (ra) field 1115 (also referred to as a receiver address (a1)), and a frame check sequence (FCS) field 1140. FIG. 11 further indicates the size in octets of each of the fields 1105-1140. The ra field 1115 comprises a full MAC address of a device, which is a 48-bit (6 octet) value. Summing the value of all of the field sizes gives the overall size of the uncompressed CTS frame 1100, which is 14 octets.

Figure 12:
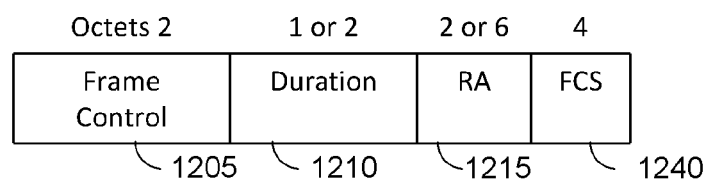
FIG. 12 illustrates a compressed clear to send (CTS) control frame.

FIG. 12 illustrates a compressed clear to send (CTS) control frame 1200. As shown, the CTS frame 1200 includes 4 different fields: a frame control (fc) field 1205, a duration field 1210, a receiver address (ra) field 1215 (also referred to as a receiver address (a1)), and a frame check sequence (FCS) field 1240. FIG. 12 further indicates the size in octets of each of the fields 1205-1240. As shown, the ra field 1215 is 6 octets in length for a global identifier or 2 octets in length for a local identifier. In one aspect, the ra field 1215 is copied from the to field 1020 of the RTS control frame 1000 for which the CTS frame 1200 is sent as a response. In another aspect, the value of the ra field 1215 is the AID of the transmitting device (or the 13 lsb of the MAC address of the transmitting device or a hash of either). The duration field 1210 may be reduced in size (e.g., to 1 byte) from duration field 912 of the uncompressed CTS control frame 900, for example, by having the value of the duration field 1210 indicate a number of transmit opportunity (TX-OP) periods as discussed above. A recipient of the CTS may determine if it is a CTS transmitted based on an RTS transmitted by the recipient by determining if the CTS is received a short inter frame space (SIFS) time after the RTS was transmitted. Alternatively, a recipient of the CTS may be the transmitter of the CTS and therefore can identify it transmitted the CTS.

Figure 13:
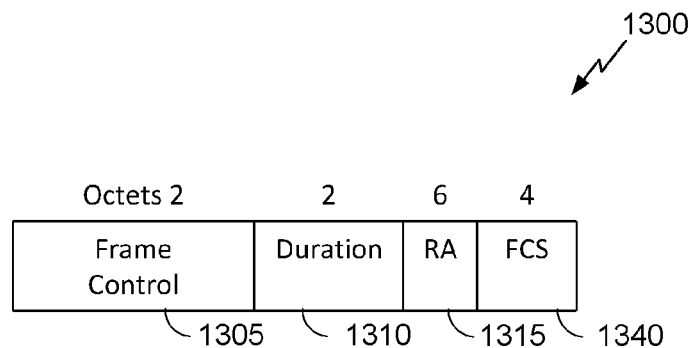
FIG. 13 illustrates an uncompressed ACK control frame.

FIG. 13 illustrates an uncompressed ACK control frame 1300. An ACK 1300 may be transmitted by a device in response to receipt of a frame. As shown, the ACK frame 1300 includes 4 different fields: a frame control (fc) field 1305, a duration field 1310, a receiver address (ra) field 1315 (also referred to as a receiver address (a1)), and a frame check sequence (FCS) field 1340. FIG. 13 further indicates the size in octets of each of the fields 1305-1340. The ra field 1315 comprises a full MAC address of a device, which is a 48-bit (6 octet) value. Summing the value of all of the field sizes gives the overall size of the uncompressed ACK frame 1300, which is 14 octets.

Figure 14:
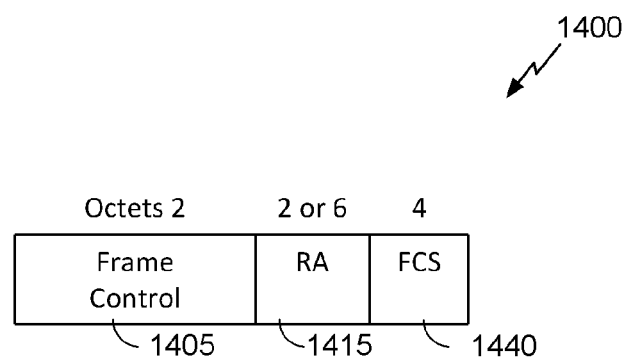
FIG. 14 illustrates a compressed ACK control frame.

FIG. 14 illustrates a compressed ACK control frame 1400. As shown, the ACK frame 1400 includes 3 different fields: a frame control (fc) field 1405, a receiver address (ra) field 1415 (also referred to as a receiver address (a1)), and a frame check sequence (FCS) field 1440. FIG. 14 further indicates the size in octets of each of the fields 1405-1440. As shown, the ra field 1415 is 6 octets in length for a global identifier or 2 octets in length for a local identifier. In one aspect, the ra field 1415 is copied from a field of the frame for which the ACK frame 1400 is sent as a response. In another aspect, the value of the ra field 1415 is the AID of the transmitting device (or the 13 lsb of the MAC address of the transmitting device or a hash of either). A recipient of the ACK may determine if it is a ACK transmitted based on an frame transmitted by the recipient by determining if the ACK is received a short inter frame space (SIFS) time after the frame was transmitted.

Figure 15:
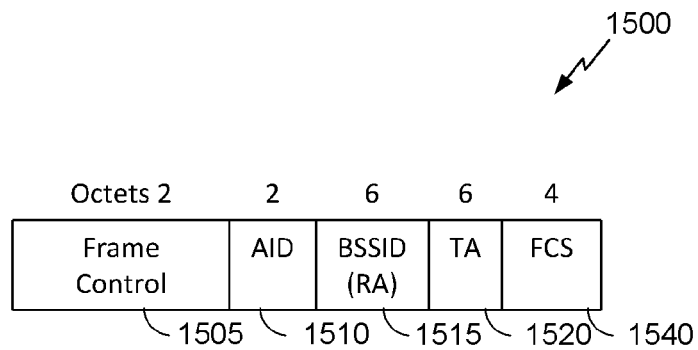
FIG. 15 illustrates an uncompressed power save poll (ps-poll) control frame.

FIG. 15 illustrates an uncompressed power save poll (ps-poll) control frame 1500. A ps-poll may be transmitted by a device to determine whether a device is in a power save mode and/or when the device will not be in a power save mode. As shown, the ps-poll frame 1500 includes 5 different fields: a frame control (fc) field 1505, a duration field 1510, a receiver address (ra) field 1515 (also referred to as a receiver address (a1)), a transmitter address (ta) field 1520 (also referred to as a transmitter address (a2)), and a frame check sequence (FCS) field 1540. FIG. 15 further indicates the size in octets of each of the fields 1505-1540. Each of the ra and ta fields 1515-1520 comprises a full MAC address of a device, which is a 48-bit (6 octet) value. The duration field 1510 includes an AID of the device sending the ps-poll frame 1500. Summing the value of all of the field sizes gives the overall size of the uncompressed ps-poll frame 1500, which is 20 octets.

Figure 16:
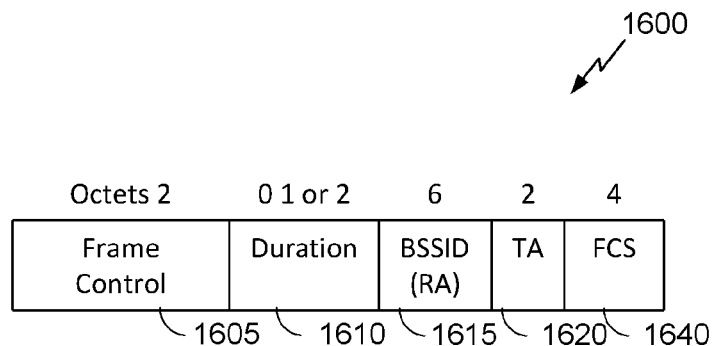
FIG. 16 illustrates a compressed power save poll (ps-poll) control frame.

FIG. 16 illustrates a compressed power save poll (ps-poll) control frame 1600. As shown, the ps-poll frame 1600 includes 5 different fields: a frame control (fc) field 1605, a duration field 1610 (which may be removed), a receiver address (ra) field 1615 (also referred to as a receiver address (a1)), a transmitter address (ta) field 1620 (also referred to as a transmitter address (a2)), and a frame check sequence (FCS) field 1640. FIG. 16 further indicates the size in octets of each of the fields 1605-1640. As shown, the ra field 1615 is 6 octets in length for a global identifier, and the ta field 1620 is 2 octets in length for a local identifier. The duration field 1610 may be reduced in size (e.g., to 1 byte) from duration field 1510 of the uncompressed ps-poll control frame 1500, for example, by having the value of the duration field 1610 indicate a number of transmit opportunity (TX-OP) periods as discussed above. The duration field 1610 may indicate a data delivery time.

Figure 17:
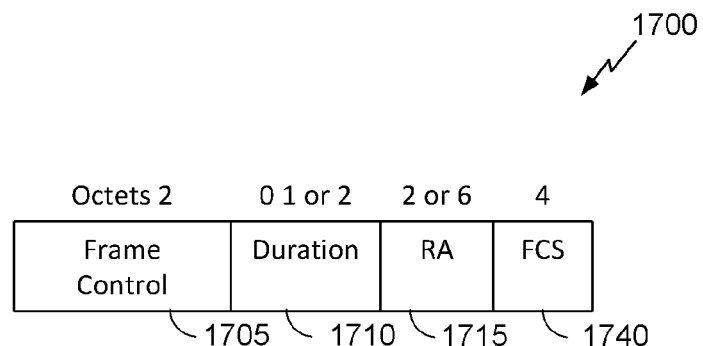
FIG. 17 illustrates a compressed ps-poll ACK control frame.

FIG. 17 illustrates a compressed ps-poll ACK control frame 1700. As shown, the ps-poll ACK frame 1700 includes 4 different fields: a frame control (fc) field 1705, a duration field 1710 (which may be removed), a receiver address (ra) field 1715 (also referred to as a receiver address (a1)), and a frame check sequence (FCS) field 1740. FIG. 17 further indicates the size in octets of each of the fields 1705-1740. As shown, the ra field 1715 is 6 octets in length for a global identifier or 2 octets in length for a local identifier. In one aspect, the ra field 1715 is copied from a field of the ps-poll frame 1600 for which the ps-poll ACK frame 1700 is sent as a response. In another aspect, the value of the ra field 1715 is the AID of the transmitting device (or the 13 lsb of the MAC address of the transmitting device or a hash of either). A recipient of the ps-poll ACK may determine if it is a ps-poll ACK transmitted based on ps-poll frame transmitted by the recipient by determining if the ps-poll ACK is received a short inter frame space (SIFS) time after the ps-poll frame was transmitted. The duration field 1710 may indicate when the transmitter will next wake from a power save mode.

Figure 18:
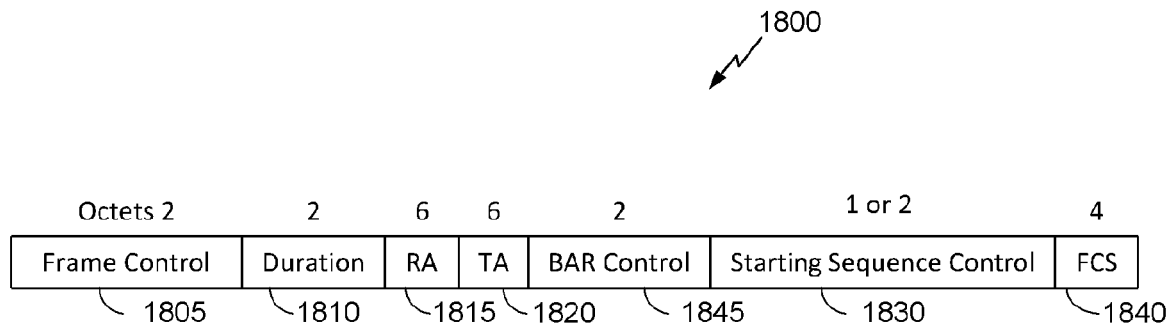
FIG. 18 illustrates an uncompressed block ACK request (BAR) control frame.

FIG. 18 illustrates an uncompressed block ACK request (BAR) control frame 1800. For example, a device may send the BAR frame 1800 to another device requesting the other device to send a block ACK (BA). As shown, the BAR frame 1800 includes 7 different fields: a frame control (fc) field 1805, a duration/identification (duration) field 1810, a receiver address (ra) field 1815 (also referred to as a receiver address (a1)), a transmitter address (ta) field 1820 (also referred to as a transmitter address (a2)), a BAR control field 1845, a starting sequence control (sc) field 1830, and a frame check sequence (FCS) field 1840. FIG. 18 further indicates the size in octets of each of the fields 1805-1845. Each of the ra field 1815 and the ta field 1820 comprises a full MAC address of a device, which is a 48-bit (6 octet) value. Summing the value of all of the field sizes gives the overall size of the uncompressed BAR frame 1800, which is 24 octets.

Figure 19:
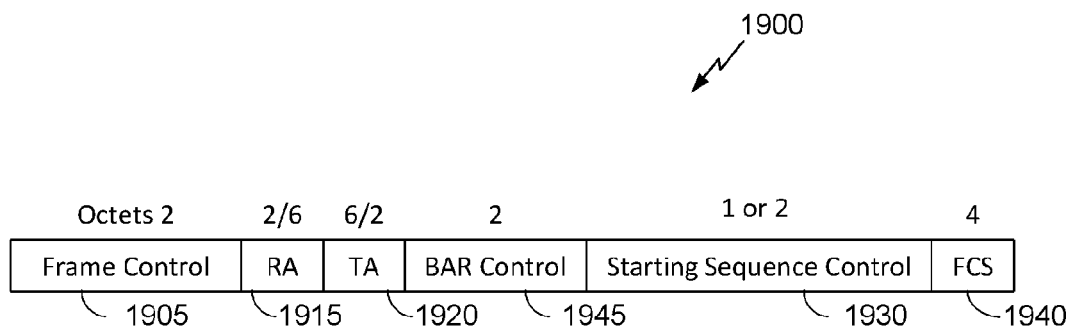
FIG. 19 illustrates a compressed BAR control frame.

FIG. 19 illustrates a compressed BAR control frame 1900. As shown, the BAR frame 1900 includes 7 different fields: a frame control (fc) field 1905, a receiver address (ra) field 1915 (also referred to as a receiver address (a1)), a transmitter address (ta) field 1920 (also referred to as a transmitter address (a2)), a BAR control field 1945, a starting sequence control (sc) field 1930, and a frame check sequence (FCS) field 1940. FIG. 19 further indicates the size in octets of each of the fields 1905-1940. As shown, one of the ra field 1915 and the ta field 1920 is 6 octets in length for a global identifier, while the other is 2 octets in length for a local identifier as discussed above.

Figure 20:
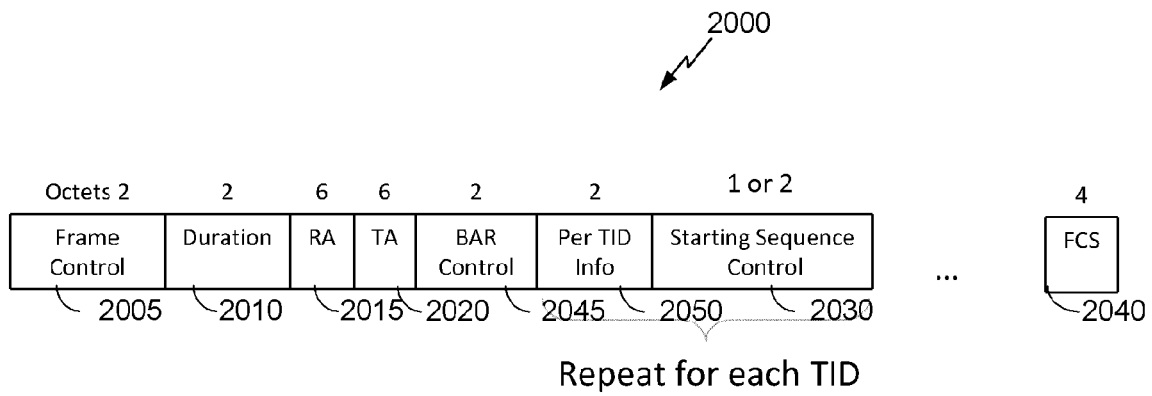
FIG. 20 illustrates an uncompressed multi traffic identifier (TID) block ACK request (multi-TID BAR) control frame.

FIG. 20 illustrates an uncompressed multi traffic identifier (TID) block ACK request (multi-TID BAR) control frame 2000. For example, a device may send a multi-TID BAR to another device requesting the other device to send a block ACK (BA) for each TID requested in the multi-TID BAR. As shown, the multi-TID BAR frame 2000 includes 8 different fields (with the per TID info field 2050 and sc field 2030 being repeated for each TID): a frame control (fc) field 2005, a duration/identification (duration) field 2010, a receiver address (ra) field 2015 (also referred to as a receiver address (a1)), a transmitter address (ta) field 2020 (also referred to as a transmitter address (a2)), a multi-TID BAR control field 2045, a per TID info field 2050, a starting sequence control (sc) field 2030, and a frame check sequence (FCS) field 2040. FIG. 20 further indicates the size in octets of each of the fields 2005-2045. Each of the ra field 2015 and the ta field 2020 comprises a full MAC address of a device, which is a 48-bit (6 octet) value. Summing the value of all of the field sizes gives the overall size of the uncompressed multi-TID BAR frame 2000.

Figure 21:
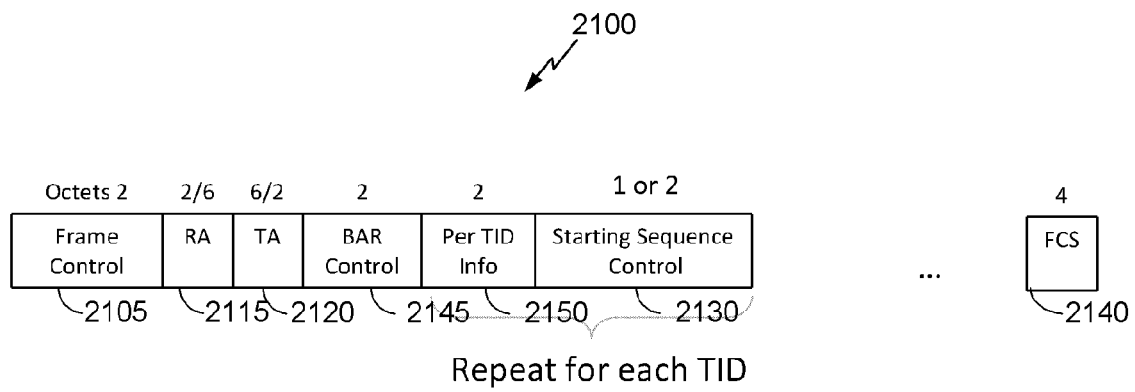
FIG. 21 illustrates a compressed multi-TID BAR control frame.

FIG. 21 illustrates a compressed multi-TID BAR control frame 2100. As shown, the multi-TID BAR frame 2100 includes 7 different fields (with the per TID info field 2050 and sc field 2030 being repeated for each TID): a frame control (fc) field 2105, a receiver address (ra) field 2115 (also referred to as a receiver address (a1)), a transmitter address (ta) field 2120 (also referred to as a transmitter address (a2)), a multi-TID BAR control field 2145, a per TID info field 2150, a starting sequence control (sc) field 2130, and a frame check sequence (FCS) field 2140. FIG. 21 further indicates the size in octets of each of the fields 2105-2140. As shown, one of the ra field 2115 and the ta field 2120 is 6 octets in length for a global identifier, while the other is 2 octets in length for a local identifier as discussed above.

Figure 22:
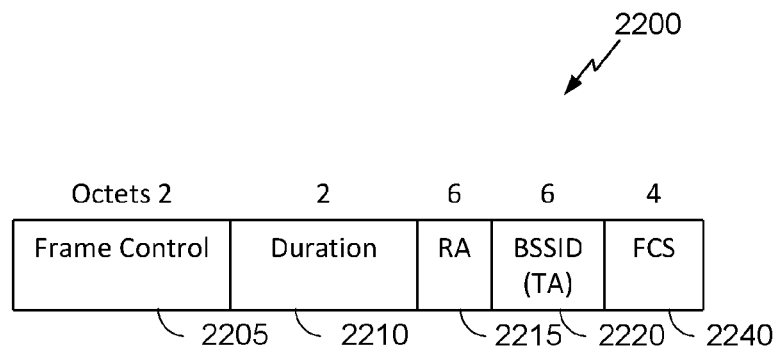
FIG. 22 illustrates an uncompressed contention free end (cf-end) and/or cf-end+cf-ACK control frame.

FIG. 22 illustrates an uncompressed contention free end (cf-end) and/or cf-end+cf-ACK control frame 2200. A cf-end may be transmitted by a device signaling the end of a contention free period. A cf-end+ACK may be transmitted by a device signaling the end of a contention free period and ACK receipt of another frame in the same message. As shown, the cf-end and/or cf-end+ACK frame 2200 includes 5 different fields: a frame control (fc) field 2205, a duration field 2210, a receiver address (ra) field 2215 (also referred to as a receiver address (a1)), a transmitter address (ta) field 2220 (also referred to as a transmitter address (a2)), and a frame check sequence (FCS) field 2240. FIG. 22 further indicates the size in octets of each of the fields 2205-2240. Each of the ra and ta fields 2215-2220 comprises a full MAC address of a device, which is a 48-bit (6 octet) value. Summing the value of all of the field sizes gives the overall size of the uncompressed cf-end and/or cf-end+ACK frame 2200, which is 20 octets.

Figure 23:
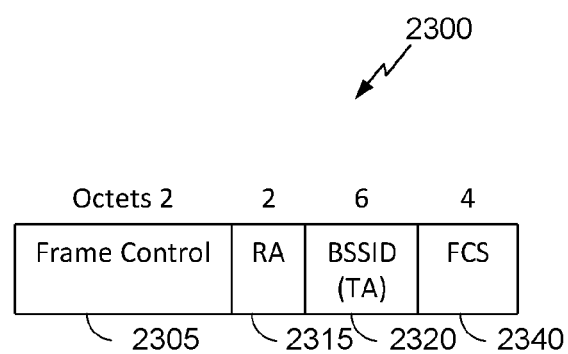
FIG. 23 illustrates a compressed cf-end and/or cf-end+ACK control frame.

FIG. 23 illustrates a compressed cf-end and/or cf-end+ACK control frame 2300.

As shown, the cf-end and/or cf-end+ACK frame 2300 includes 4 different fields: a frame control (fc) field 2305, a receiver address (ra) field 2315 (also referred to as a receiver address (a1)), a transmitter address (ta) field 2320 (also referred to as a transmitter address (a2)), and a frame check sequence (FCS) field 2340. FIG. 23 further indicates the size in octets of each of the fields 2305-2340. As shown, one of the ra field 2315 is 2 octets in length for a local identifier and the ta field 2320 is 6 octets in length for a global identifier.

Figure 24:
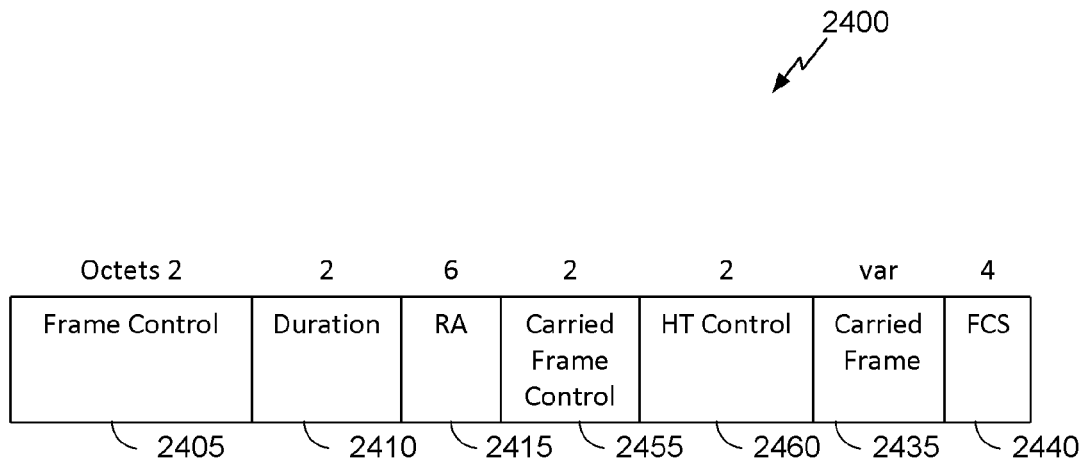
FIG. 24 illustrates an uncompressed control wrapper frame.

FIG. 24 illustrates an uncompressed control wrapper frame 2400. For example, a device may send a frame that supports high throughput (HT) in a control wrapper (the frame is the carried frame in the control wrapper) so that devices that do not support to HT can still read the wrapper of the frame. As shown, the control wrapper frame 2400 includes 7 different fields: a frame control (fc) field 2405, a duration/identification (duration) field 2410, a receiver address (ra) field 2415 (also referred to as a receiver address (a1)), a carried frame control field 2455, an HT control field 2460, a control wrapper control field 2445, a carried frame 2435, and a frame check sequence (FCS) field 2440. FIG. 24 further indicates the size in octets of each of the fields 2405-2460. The ra field 2415 comprises a full MAC address of a device, which is a 48-bit (6 octet) value. Summing the value of all of the field sizes gives the overall size of the uncompressed control wrapper frame 2400.

Figure 25:
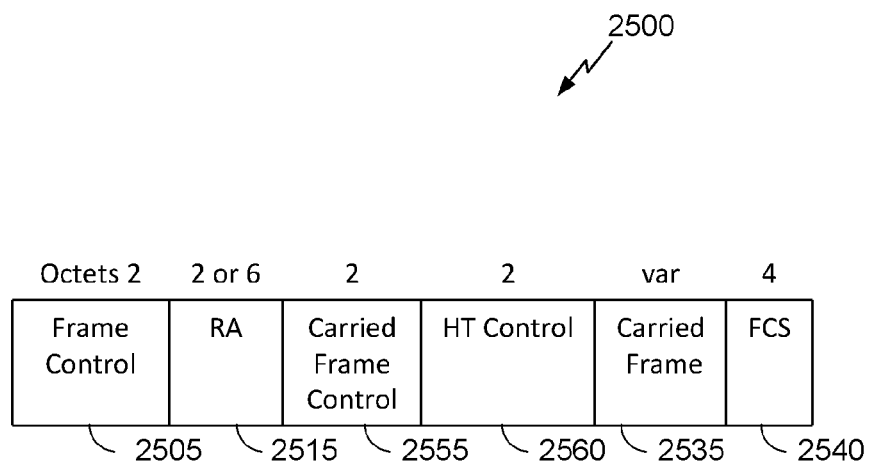
FIG. 25 illustrates a compressed control wrapper control frame.

FIG. 25 illustrates a compressed control wrapper control frame 2500. As shown, the control wrapper frame 2500 includes 6 different fields: a frame control (fc) field 2505, a receiver address (ra) field 2515 (also referred to as a receiver address (a1)), a carried frame control field 2555, an HT control field 2560, a control wrapper control field 2545, a carried frame 2535, and a frame check sequence (FCS) field 2540. FIG. 25 further indicates the size in octets of each of the fields 2505-2560. As shown, the ra field 2515 is 6 octets in length for a global identifier or 2 octets in length for a local identifier.

Figure 26:
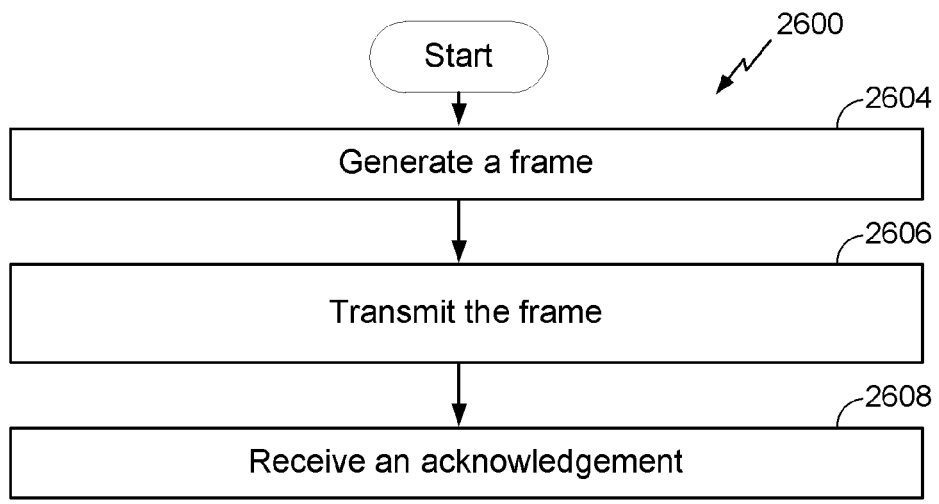
FIG. 26 illustrates an aspect of a method for transmitting a management frame or control frame.

FIG. 26 illustrates an aspect of a method 2600 for transmitting a management frame or control frame. The method 2600 may be used to selectively generate any of the frames discussed herein. The frame may be generated at either the AP 104 or the STA 106 and transmitted to another node in the wireless network 100. Although the method 2600 is described below with respect to elements of the wireless device 202t, those having ordinary skill in the art will appreciate that other components may be used to implement one or more of the steps described herein.

At block 2604, the frame is generated. In some embodiments, the frame includes a first field indicating the type of frame (e.g., compressed or not compressed) used in the packet. The generation may be performed by the processor 204 and/or the DSP 220, for example. The frame may include a local identifier of either a transmitter of the data packet or a receiver of the data packet, and a global identifier of the other of the transmitter of the data packet and the receiver of the data packet.

Thereafter, at block 2606, the frame is wirelessly transmitted. The transmission may be performed by the transmitter 210, for example.

Figure 27:
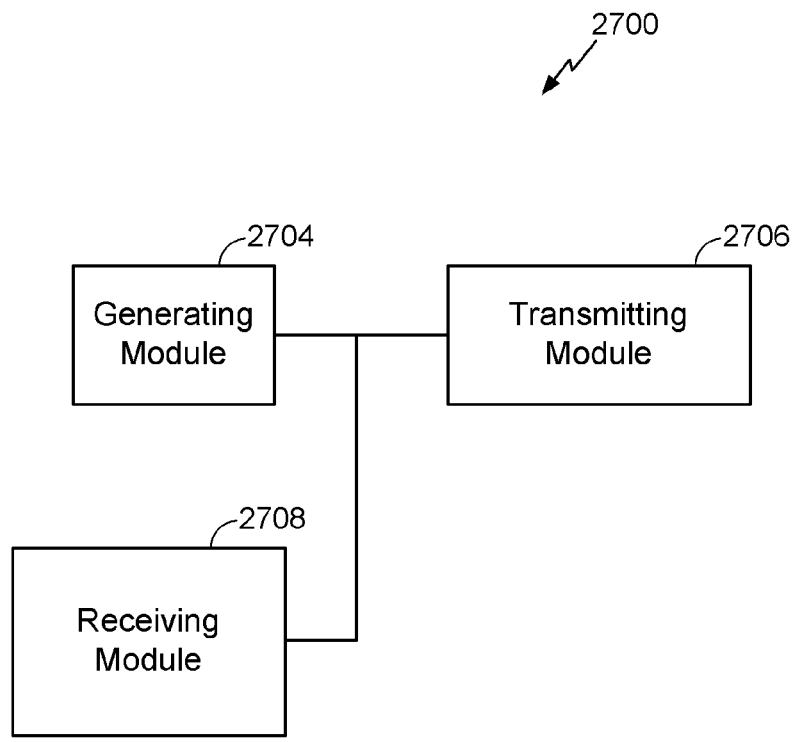
FIG. 27 is a functional block diagram of an exemplary wireless device that may be employed within the wireless communication system of FIG. 1.

FIG. 27 is a functional block diagram of an exemplary wireless device 2700 that may be employed within the wireless communication system 100. The device 2700 comprises a generating module 2704 for generating the frame. The generating module 2704 may be configured to perform one or more of the functions discussed above with respect to the block 2604 illustrated in FIG. 26. The generating module 2604 may correspond to one or more of the processor 204 and the DSP 220. The device 2700 further comprises a transmitting module 2706 for wirelessly transmitting the generated frame. The transmitting module 2706 may be configured to perform one or more of the functions discussed above with respect to the block 2606 illustrated in FIG. 26. The transmitting module 2706 may correspond to the transmitter 210.

Figure 28:
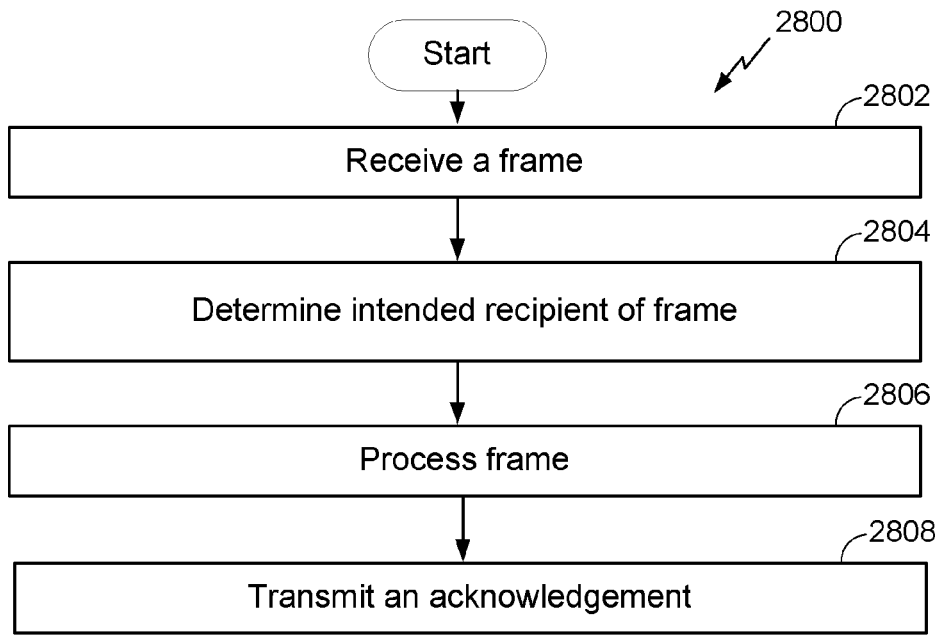
FIG. 28 illustrates an aspect of a method for receiving and processing a frame.

FIG. 28 illustrates an aspect of a method 2800 for receiving and processing a frame. The method 2800 may be used to receive and process any type of frame (e.g., compressed management and/or control frames) discussed herein. The frame may be received at either the AP 104 or the STA 106 from another node in the wireless network 100. Although the method 2800 is described below with respect to elements of the wireless device 202r, those having ordinary skill in the art will appreciate that other components may be used to implement one or more of the steps described herein.

At block 2802, a wireless communication comprising the frame is received. The reception may be performed by the receiver 212, for example. In some aspects, the frame includes a first field indicating the type of frame (e.g., compressed or not compressed) used in the packet.

Subsequently, at block 2804, it is determined if the wireless device 202r is the intended recipient of the frame. The determination may be made based on the frame which may include a local identifier of either a transmitter of the data frame or a receiver of the data frame, and a global identifier of the other of the transmitter of the data frame and the receiver of the data frame. The determining may be performed by the processor 204, the signal detector 218, and/or the DSP 220, for example.

Further, at a block 2806, the wireless device 202r processes the frame if it is the intended recipient. The processing may be performed by the processor 204, the signal detector 218, and/or the DSP 220, for example.

Figure 29:
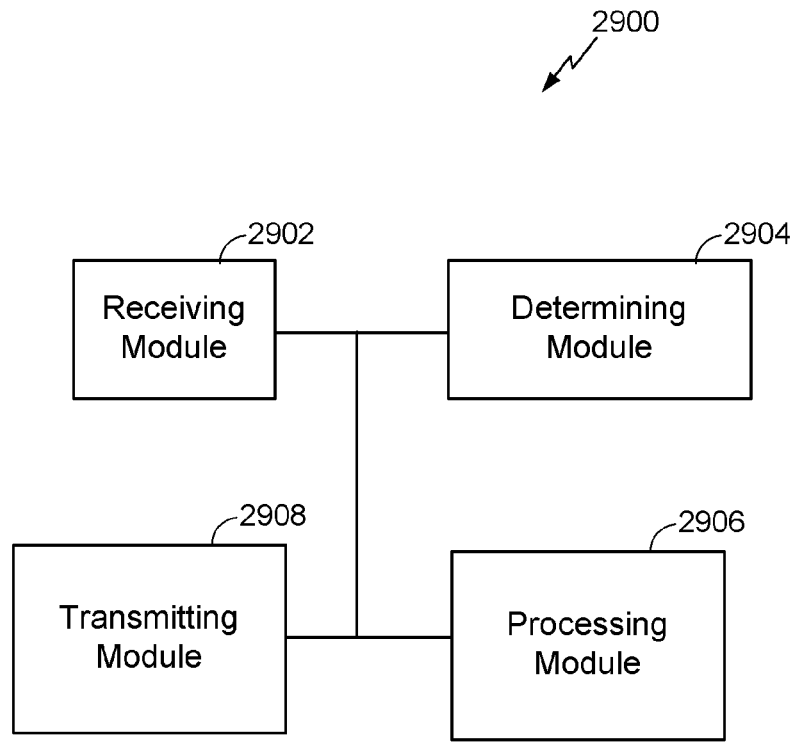
FIG. 29 is a functional block diagram of another exemplary wireless device that may be employed within the wireless communication system of FIG. 1.

FIG. 29 is a functional block diagram of another exemplary wireless device 2900 that may be employed within the wireless communication system 100. The device 2900 comprises a receiving module 2902 for wirelessly receiving a wireless communication comprising the frame. The receiving module 2902 may be configured to perform one or more of the functions discussed above with respect to the block 2802 illustrated in FIG. 28. The receiving module 2902 may correspond to the receiver 212. The device 2900 further comprises a determining module 2904 determining an intended recipient of the frame. The determining module 2904 may be configured to perform one or more of the functions discussed above with respect to the block 2804 illustrated in FIG. 28. The determining module 2904 may correspond to one or more of the processor 204, the signal detector 218, and the DSP 220. The device 2900 further comprises a processing module 2906 for processing the frame. The processing module 2906 may be configured to perform one or more of the functions discussed above with respect to the block 2806 illustrated in FIG. 28. The processing module 2906 may correspond to one or more of the processor 204, the signal detector 218, and the DSP 220.

Figure 30:
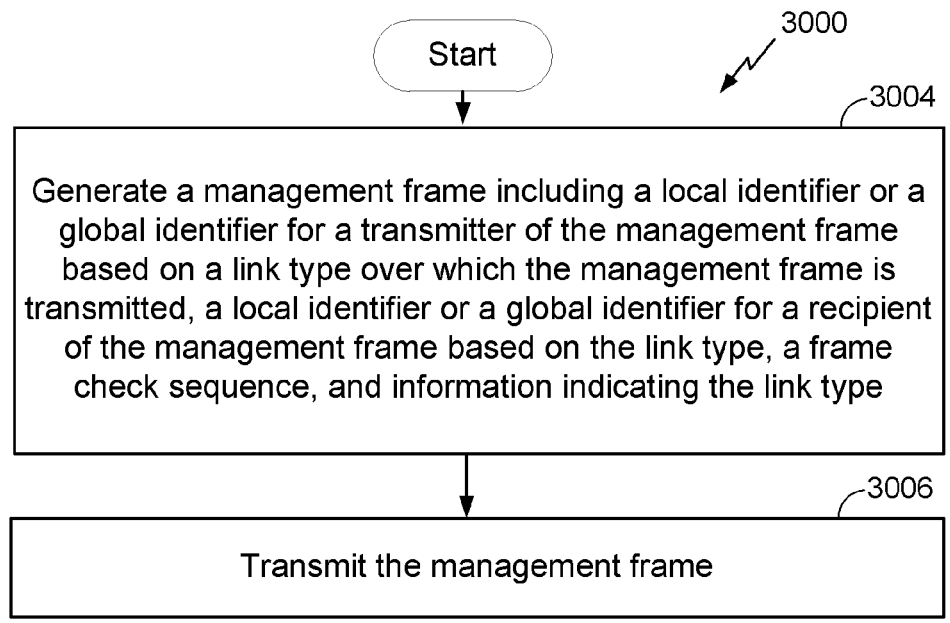
FIG. 30 illustrates an aspect of a method of communicating in a wireless network.

FIG. 30 illustrates an aspect of a method 3000 of communicating in a wireless network. The method 3000 may be used to selectively generate any of the management frames discussed herein. The frame may be generated at either the AP 104 or the STA 106 and transmitted to another node in the wireless network 100. Although the method 3000 is described below with respect to elements of the wireless device 202, those having ordinary skill in the art will appreciate that other components may be used to implement one or more of the steps described herein.

At block 3004, the method begins by generating a management frame including a local identifier or a global identifier for a transmitter of the management frame based on a link type over which the management frame is transmitted, a local identifier or a global identifier for a recipient of the management frame based on the link type, a frame check sequence, and information indicating the link type. The generation may be performed by the processor 204 and/or the DSP 220, for example. At block 3006, the method continues by transmitting the management frame. The transmission may be performed by the transmitter 210 or the transceiver 214, for example.

In some aspects, the link type includes at least one of a downlink, an uplink, and a direct link. In some aspects, the local identifier comprises an access identifier, and the global identifier comprises a media access control (MAC) address. In some aspects, the local identifier comprises 13 bits and the global identifier comprises 48 bits. For example, as described above, instead of using a globally unique identifier for a device (e.g., MAC address) for both the destination address (da) field (e.g., da field 415) and the sender address (sa) field 420 (e.g., sa field 420), one of the da field 415 or the sa field 420 may use a local identifier (e.g., an access identifier (AID)) that uniquely identifies a device in a particular basic service set (BSS), but does not necessarily uniquely identify the device globally. Accordingly, one of the da field 415 or the sa field 420 may be 2 octets in length to accommodate the shorter local identifier, as opposed to 6 octets in length as needed for the global identifier. The selection of which of the da field 415 and the sa field 420 includes a local identifier or a global identifier is based on the device sending the packet and the device receiving the packet. For example, the selection may be different for packets sent on each of a downlink from an AP to a STA, an uplink from a STA to an AP, and a direct link from one STA to another STA. Indication of the type of link (e.g., downlink, uplink, or direct link) may be made by one or more fields in the management frame. In some aspects, the information indicating the link type may be included in a from-access point field. For example, a from-AP field may have one value for a management frame sent on a downlink and another value for a management frame sent on an uplink. In some aspects, the information identifying the link type may be included in a to-distribution system (to-ds) field and a from-distribution system (from-ds) field. For example, a from-ds and/or to-ds field may have different values for different link types. A device receiving the management frame may therefore determine the link the frame is received over (e.g., based on the information indicating the link type) and then determine the length of the da field and/or sa field in the frame.

Figure 31:
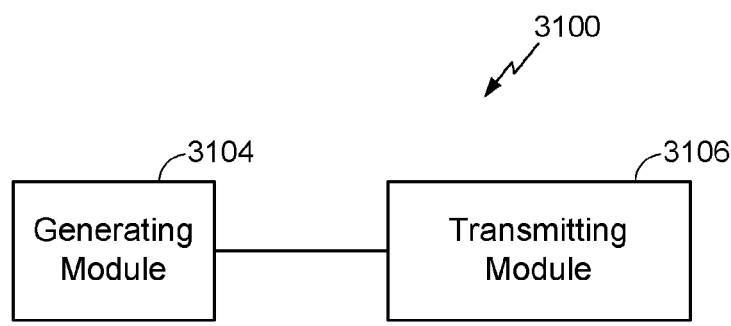
FIG. 31 is a functional block diagram of an exemplary wireless device that may be employed within the wireless communication system of FIG. 1.

FIG. 31 is a functional block diagram of an exemplary wireless device 3100 that may be employed within the wireless communication system 100. The device 3100 comprises a generating module 3104 for generating a management frame including a local identifier or a global identifier for a transmitter of the management frame based on a link type over which the management frame is transmitted, a local identifier or a global identifier for a recipient of the management frame based on the link type, a frame check sequence, and information indicating the link type. The generating module 3104 may be configured to perform one or more of the functions discussed above with respect to the block 3004 illustrated in FIG. 30. The generating module 3104 may correspond to one or more of the processor 204 and the DSP 220. The device 3100 further comprises a transmitting module 3106 for transmitting the management frame. The transmitting module 3106 may be configured to perform one or more of the functions discussed above with respect to the block 3006 illustrated in FIG. 30. The transmitting module 3106 may correspond to one or more of the transmitter 210 and the transceiver 214.

Figure 32:
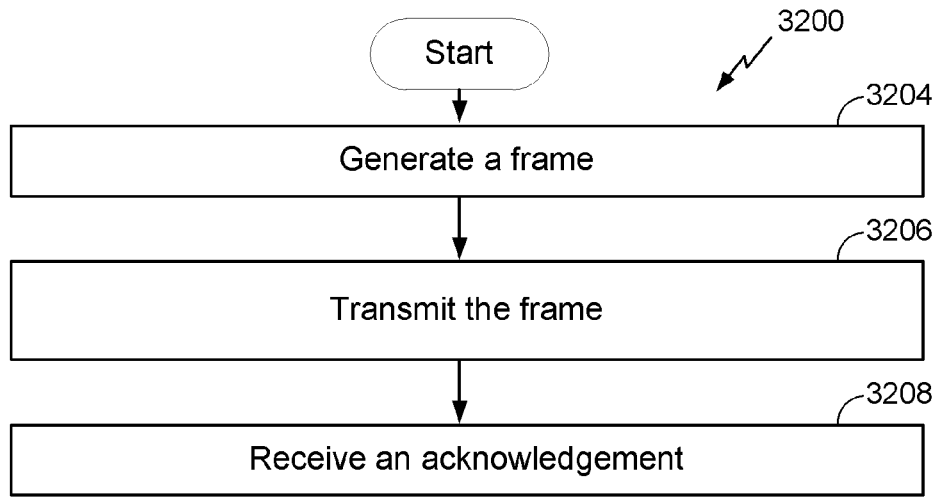
FIG. 32 illustrates an aspect of another method of communicating in a wireless network.

FIG. 32 illustrates an aspect of a method 3200 of communicating in a wireless network. The method 3200 may be used to selectively generate any of the control frames discussed herein. The frame may be generated at either the AP 104 or the STA 106 and transmitted to another node in the wireless network 100. Although the method 3200 is described below with respect to elements of the wireless device 202, those having ordinary skill in the art will appreciate that other components may be used to implement one or more of the steps described herein.

At block 3204, the method begins by generating a control frame selectively including a local identifier or a global identifier based on a link type over which the control frame is transmitted, a frame check sequence, and information indicating the link type. The generation may be performed by the processor 204 and/or the DSP 220, for example. At block 3206, the method continues by transmitting the control frame. The transmission may be performed by the transmitter 210 or the transceiver 214, for example.

In some aspects, the link type includes at least one of a downlink, an uplink, and a direct link. In some aspects, the local identifier comprises an access identifier, and the global identifier comprises a media access control (MAC) address. In some aspects, the local identifier comprises 13 bits and the global identifier comprises 48 bits. For example, as described above, one of the da field 415 or the sa field 420 may use a local identifier (e.g., an access identifier (AID)) uniquely identifying a device in a particular basic service set (BSS). The selection of which of the da field 415 and the sa field 420 includes a local identifier or a global identifier is based on the device sending the packet and the device receiving the packet. For example, the selection may be different for packets sent on each of a downlink from an AP to a STA, an uplink from a STA to an AP, and a direct link from one STA to another STA. Indication of the type of link (e.g., downlink, uplink, or direct link) may be made by one or more fields in the management frame. In some aspects, the information indicating the link type may be included in a from-access point field. For example, a from-AP field may have one value for a management frame sent on a downlink and another value for a management frame sent on an uplink. In some aspects, the information identifying the link type may be included in a to-distribution system (to-ds) field and a from-distribution system (from-ds) field. For example, a from-ds and/or to-ds field may have different values for different link types. A device receiving the management frame may therefore determine the link the frame is received over (e.g., based on the information indicating the link type) and then determine the length of the da field and/or sa field in the frame.

In some aspects, the control frame comprises at least one of: a request to send frame, a clear to send frame, an acknowledgment frame, a power save poll frame, a power save poll acknowledgment frame, a block acknowledgement request frame, a multi traffic identifier block acknowledgment request frame, a contention free end frame, a contention free and acknowledgment frame, and a control wrapper.

Figure 33:
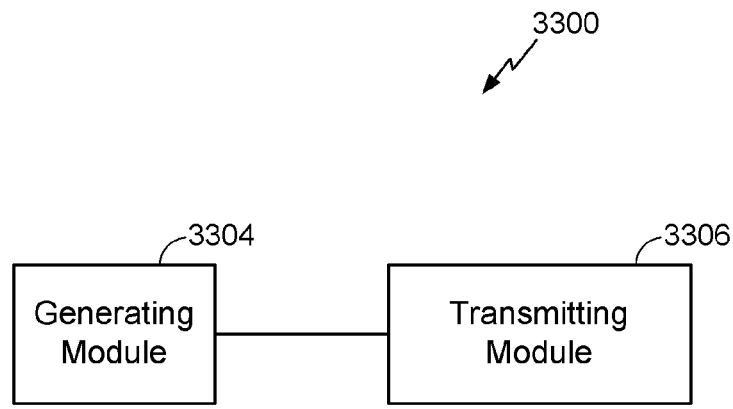
FIG. 33 is a functional block diagram of another exemplary wireless device that may be employed within the wireless communication system of FIG. 1.

FIG. 33 is a functional block diagram of an exemplary wireless device 3300 that may be employed within the wireless communication system 100. The device 3300 comprises a generating module 3304 for generating a control frame selectively including a local identifier or a global identifier based on a link type over which the control frame is transmitted, a frame check sequence, and information indicating the link type. The generating module 3304 may be configured to perform one or more of the functions discussed above with respect to the block 3204 illustrated in FIG. 32. The generating module 3304 may correspond to one or more of the processor 204 and the DSP 220. The device 3300 further comprises a transmitting module 3306 for transmitting the control frame. The transmitting module 3306 may be configured to perform one or more of the functions discussed above with respect to the block 3206 illustrated in FIG. 32. The transmitting module 3306 may correspond to one or more of the transmitter 210 and the transceiver 214.

As used herein, the term "determining" encompasses a wide variety of actions.

For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless network, the method comprising:
    selecting a local identifier or a global identifier of a transmitter based on a link type over which a management frame is to be transmitted;
    selecting a local identifier or a global identifier of a receiver based on the link type for a recipient of the management frame;
    generating the management frame including,
        the local identifier or the global identifier for the transmitter and the local identifier or the global identifier for the recipient, the local identifier being an access identifier comprising 13 bits, the global identifier being a media access control address comprising 48 bits,
        a frame check sequence, and
        information indicating the link type, wherein the information is included in a to-distribution system field, a from-distribution system field, or a from-access point field; and
    transmitting the management frame.

2. The method of claim 1, wherein the link type includes at least one of a downlink, an uplink, and a direct link.

3. An apparatus for communicating in a wireless network, the apparatus comprising:
    a processor configured to:
    select a local identifier or a global identifier of a transmitter based on a link type over which a management frame is to be transmitted;
    select a local identifier or a global identifier of a receiver based on the link type for a recipient of the management frame;
    generate the management frame including,
        the local identifier or global identifier for the transmitter and the local identifier or the global identifier for the recipient, the local identifier being an access identifier comprising 13 bits, the global identifier being a media access control address comprising 48 bits,
        a frame check sequence, and
        information indicating the link type, wherein the information is included in a to-distribution system field, a from-distribution system field, or a from-access point field; and
    a transmitter configured to transmit the management frame.

4. The apparatus of claim 3, wherein the link type includes at least one of a downlink, an uplink, and a direct link.

5. An apparatus for communicating in a wireless network, the apparatus comprising:
    means for selecting a local identifier or a global identifier of a transmitter based on a link type over which a management frame is to be transmitted;
    means for selecting a local identifier or a global identifier of a receiver based on the link type for a recipient of the management frame;
    means for generating the management frame including,
        the local identifier or the global identifier for the transmitter and the local identifier or the global identifier for the recipient, the local identifier being an access identifier comprising 13 bits, the global identifier being a media access control address comprising 48 bits,
        a frame check sequence, and
        information indicating the link type, wherein the information is included in a to-distribution system field, a from-distribution system field, or a from-access point field; and
    means for transmitting the management frame.

6. The apparatus of claim 5, wherein the link type includes at least one of a downlink, an uplink, and a direct link.

7. A non-transitory computer-readable medium comprising instructions that when executed by a computer cause the computer to perform a method of communicating in a wireless network, the method comprising:
    selecting a local identifier or a global identifier of a transmitter based on a link type over which a management frame is to be transmitted;
    selecting a local identifier or a global identifier of a receiver based on the link type for a recipient of the management frame;
    generating a management frame including the local identifier or the global identifier for the transmitter and the local identifier or the global identifier for the recipient, the local identifier being an access identifier comprising 13 bits, the global identifier being a media access control address comprising 48 bits;
    generating a frame check sequence;
    generating information indicating the link type, wherein the information is included in a to-distribution system field, a from-distribution system field, or a from-access point field; and
    transmitting the management frame.

8. The non-transitory computer-readable medium of claim 7, wherein the link type includes at least one of a downlink, an uplink, and a direct link.

9. A method of communicating in a wireless network, the method comprising:
- generating a control frame selectively including a local identifier or a global identifier based on a link type over which the control frame is to be transmitted, the local identifier being an access identifier comprising 13 bits, the global identifier being a media access control address comprising 48 bits, and the control frame comprising at least one of:
  - a request to send frame, a clear to send frame, an acknowledgment frame, a power save poll frame, a power save poll acknowledgment frame, a block acknowledgement request frame, a multi traffic identifier block acknowledgment request frame, a contention free end frame, a contention free and acknowledgment frame, and a control wrapper,
  - a frame check sequence, and
  - information indicating the link type, wherein the information is included in a to-distribution system field; and
- transmitting the control frame.

10. The method of claim 9, wherein the link type includes at least one of a downlink, an uplink, and a direct link.

11. The method of claim 9, wherein the information is included in a from-distribution system field.

12. The method of claim 9, wherein the information is included in a from-access point field.

13. An apparatus for communicating in a wireless network, the apparatus comprising:
- a processor configured to generate a control frame selectively including:
  - a local identifier or a global identifier based on a link type over which the control frame is to be transmitted, the local identifier being an access identifier comprising 13 bits, the global identifier being a media access control address comprising 48 bits, and the control frame comprising at least one of:
    - a request to send frame, a clear to send frame, an acknowledgment frame, a power save poll frame, a power save poll acknowledgment frame, a block acknowledgement request frame, a multi traffic identifier block acknowledgment request frame, a contention free end frame, a contention free and acknowledgment frame, and a control wrapper,
    - a frame check sequence, and
    - information indicating the link type, wherein the information is included in a to-distribution system field; and
- a transmitter configured to transmit the control frame.

14. The apparatus of claim 13, wherein the link type includes at least one of a downlink, an uplink, and a direct link.

15. The apparatus of claim 13, wherein the information is included in a from-distribution system field.

16. The apparatus of claim 13, wherein the information is included in a from-access point field.

17. An apparatus for communicating in a wireless network, the apparatus comprising:
- means for generating a control frame selectively including:
  - a local identifier or a global identifier based on a link type over which the control frame is to be transmitted, the local identifier being an access identifier comprising 13 bits, the global identifier being a media access control address comprising 48 bits, and the control frame comprising at least one of:
    - a request to send frame, a clear to send frame, an acknowledgment frame, a power save poll frame, a power save poll acknowledgment frame, a block acknowledgement request frame, a multi traffic identifier block acknowledgment request frame, a contention free end frame, a contention free and acknowledgment frame, and a control wrapper,
    - a frame check sequence, and
    - information indicating the link type, wherein the information is included in a to-distribution system field; and
- means for transmitting the control frame.

18. The apparatus of claim 17, wherein the link type includes at least one of a downlink, an uplink, and a direct link.

19. The apparatus of claim 17, wherein the information is included in a from-distribution system field.

20. The apparatus of claim 17, wherein the information is included in a from-access point field.

21. A non-transitory computer-readable medium comprising instructions that when executed by a computer cause the computer to perform a method of communicating in a wireless network, the method comprising:
- generating a control frame selectively including:
  - a local identifier or a global identifier based on a link type over which the control frame is to be transmitted, the local identifier being an access identifier comprising 13 bits, the global identifier being a media access control address comprising 48 bits, and the control frame comprising at least one of:
    - a request to send frame, a clear to send frame, an acknowledgment frame, a power save poll frame, a power save poll acknowledgment frame, a block acknowledgement request frame, a multi traffic identifier block acknowledgment request frame, a contention free end frame, a contention free and acknowledgment frame, and a control wrapper,
    - a frame check sequence, and
    - information indicating the link type, wherein the information is included in a to-distribution system field; and
- transmitting the control frame.

22. The non-transitory computer-readable medium of claim 21, wherein the link type includes at least one of a downlink, an uplink, and a direct link.

23. The non-transitory computer-readable medium of claim 21, wherein the information is included in a from-distribution system field.

24. The non-transitory computer-readable medium of claim 21, wherein the information is included in a from-access point field.

* * * * *